US012653167B2

(12) United States Patent
Brunner et al.

(10) Patent No.: US 12,653,167 B2
(45) Date of Patent: Jun. 16, 2026

(54) AQUARIUM SYSTEM, BACK PANEL ASSEMBLY, AND METHODS OF USE

(71) Applicant: Spectrum Brands, Inc., Middleton, WI (US)

(72) Inventors: William Nathan Brunner, Middleton, WI (US); Gregory Van Eyk, Middleton, WI (US); Kevin Sears, Middleton, WI (US); Terry Allen Willemin, Middleton, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 18/768,968

(22) Filed: Jul. 10, 2024

(65) Prior Publication Data

US 2025/0017180 A1    Jan. 16, 2025

Related U.S. Application Data

(60) Provisional application No. 63/526,079, filed on Jul. 11, 2023.

(51) Int. Cl.
| | | |
|---|---|---|
| *A01K 63/04* | (2006.01) | |
| *A01K 63/06* | (2006.01) | |
| *B01D 27/14* | (2006.01) | |
| *B01D 46/00* | (2022.01) | |

(52) U.S. Cl.
CPC .......... *A01K 63/045* (2013.01); *A01K 63/065* (2013.01); *B01D 27/142* (2013.01); *B01D 46/0005* (2013.01)

(58) Field of Classification Search
CPC ........................... A01K 63/045; A01K 63/065
See application file for complete search history.

(56) References Cited

U.S. PATENT DOCUMENTS

| | | | |
|---|---|---|---|
| 2,172,799 A | | 9/1939 | Magnus |
| 2,652,151 A | * | 9/1953 | Legus .................. A01K 63/045 |
| | | | 210/473 |
| 2,665,250 A | | 1/1954 | Harding et al. |
| 2,744,065 A | | 5/1956 | Lacey |
| 2,761,565 A | | 9/1956 | Hutchinson |
| 3,082,935 A | | 3/1963 | Arak |
| D195,296 S | | 5/1963 | Willinger |

(Continued)

FOREIGN PATENT DOCUMENTS

| | | |
|---|---|---|
| CN | 106135115 A | 11/2016 |
| CN | 106614218 A | 5/2017 |

(Continued)

OTHER PUBLICATIONS

International Search Report and Written Opinion for PCT/US2024/037650 (Dec. 19, 2024).

(Continued)

*Primary Examiner* — Kimberly S Berona
*Assistant Examiner* — Steven J Shur
(74) *Attorney, Agent, or Firm* — Greenberg Traurig, LLP

(57) ABSTRACT

A back panel assembly for an aquarium has a housing with a dependent lip having connecting structure permitting the housing to be removably attached to an aquarium; and a cartridge holder removably positioned in the housing. The cartridge holder holds filter cartridges, each cartridge being the same size.

10 Claims, 9 Drawing Sheets

(56)  References Cited

U.S. PATENT DOCUMENTS

| | | | |
|---|---|---|---|
| 3,326,185 A | 6/1967 | Garcia | |
| D215,283 S | 9/1969 | Sesholtz | |
| 3,485,373 A | 12/1969 | Powers | |
| D218,560 S | 9/1970 | Lovitz | |
| 3,542,524 A | 11/1970 | Kimble et al. | |
| 3,566,840 A | 3/1971 | Willinger | |
| D220,486 S | 4/1971 | Sesholtz | |
| 3,630,367 A | 12/1971 | Willinger | |
| 3,635,344 A | 1/1972 | Lovitz | |
| 3,717,253 A | 2/1973 | Lovitz | |
| 3,719,278 A | 3/1973 | Kolfertz | |
| 3,722,685 A | 3/1973 | Orensten et al. | |
| 3,738,494 A | 6/1973 | Willinger et al. | |
| 3,738,620 A | 6/1973 | Ennis | |
| 3,746,169 A | 7/1973 | Willinger et al. | |
| 3,778,976 A | 12/1973 | Pond | |
| 3,785,493 A | 1/1974 | Harding | |
| 3,815,547 A | 6/1974 | Willinger et al. | |
| 3,892,663 A | 7/1975 | Wiedenmann | |
| 4,035,299 A | 7/1977 | Vroeginday | |
| 4,036,756 A | 7/1977 | Dockery | |
| 4,093,547 A | 6/1978 | Sherman et al. | |
| 4,192,255 A | 3/1980 | Willinger | |
| 4,206,719 A * | 6/1980 | Faris | A01K 63/006 |
| | | | 210/167.21 |
| 4,282,095 A | 8/1981 | Tsuhako | |
| 4,285,813 A | 8/1981 | Stewart et al. | |
| 4,385,989 A | 5/1983 | Margolis | |
| 4,392,953 A | 7/1983 | Cornelius et al. | |
| 4,490,250 A | 12/1984 | Dockery | |
| 4,532,037 A | 7/1985 | Willinger | |
| 4,589,982 A | 5/1986 | Willinger | |
| 4,645,593 A | 2/1987 | Dunk et al. | |
| 4,655,915 A | 4/1987 | Carpinone | |
| 4,684,462 A | 8/1987 | Augustyniak | |
| 4,776,127 A | 10/1988 | Jackson | |
| 4,817,561 A | 4/1989 | Byrne et al. | |
| 4,913,811 A | 4/1990 | Huang et al. | |
| 4,995,980 A | 2/1991 | Jaubert | |
| 5,002,660 A | 3/1991 | Sherman et al. | |
| 5,006,238 A | 4/1991 | Tominaga | |
| 5,034,165 A | 7/1991 | Willinger et al. | |
| 5,062,950 A * | 11/1991 | Shieh | B01D 35/143 |
| | | | 210/86 |
| 5,066,394 A | 11/1991 | Harrison | |
| 5,171,438 A | 12/1992 | Korcz | |
| 5,242,582 A | 9/1993 | Marioni | |
| 5,275,123 A | 1/1994 | Geung | |
| 5,290,436 A | 3/1994 | Danner | |
| D355,701 S | 2/1995 | Willinger et al. | |
| 5,438,959 A | 8/1995 | Stone et al. | |
| 5,453,182 A | 9/1995 | Kikuta | |
| 5,518,611 A | 5/1996 | Bresolin | |
| 5,522,987 A | 6/1996 | Bresolin | |
| 5,888,387 A | 3/1999 | Bradley | |
| 6,210,567 B1 * | 4/2001 | Takada | A01K 63/045 |
| | | | 210/287 |
| 6,299,765 B1 | 10/2001 | Fabrizio | |

| | | | |
|---|---|---|---|
| 6,303,028 B1 | 10/2001 | Marks et al. | |
| 6,533,928 B1 | 3/2003 | Terato | |
| 7,001,509 B1 | 2/2006 | Lin | |
| 7,094,340 B2 | 8/2006 | Steketee | |
| 7,213,537 B2 | 5/2007 | Sabbaugh | |
| 7,273,547 B2 | 9/2007 | Ogawa | |
| D571,891 S | 6/2008 | Mihlbauer et al. | |
| 7,429,321 B2 | 9/2008 | Willinger | |
| 7,430,989 B2 | 10/2008 | Allis | |
| 7,569,139 B2 | 8/2009 | Mihlbauer et al. | |
| 8,246,831 B2 | 8/2012 | Mcfarland | |
| 9,282,728 B2 | 3/2016 | Reid et al. | |
| 9,788,533 B2 | 10/2017 | Allen et al. | |
| 10,021,860 B2 | 7/2018 | Plante | |
| 10,136,620 B2 | 11/2018 | Lutz et al. | |
| 10,524,456 B2 | 1/2020 | Bresolin et al. | |
| 10,638,731 B2 | 5/2020 | Reid | |
| 10,806,131 B2 | 10/2020 | Hori | |
| D937,969 S | 12/2021 | Muck | |
| 11,412,717 B1 | 8/2022 | Mihlbauer et al. | |
| 2003/0150394 A1 | 8/2003 | Wolfe | |
| 2005/0258086 A1 | 11/2005 | Lin | |
| 2006/0070948 A1 | 4/2006 | Wickham | |
| 2007/0138075 A1 | 6/2007 | Chang | |
| 2015/0181843 A1 * | 7/2015 | Lutz | A01K 63/045 |
| | | | 210/85 |
| 2022/0295762 A1 | 9/2022 | Mosley | |
| 2023/0033944 A1 * | 2/2023 | Peng | A01K 63/042 |

FOREIGN PATENT DOCUMENTS

| | | | |
|---|---|---|---|
| CN | 108040955 A | 5/2018 | |
| CN | 108633810 A | 10/2018 | |
| CN | 109220964 A | 1/2019 | |
| CN | 109329176 A | 2/2019 | |
| DE | 941942 C | 4/1956 | |
| DE | 10219416 A1 | 11/2003 | |
| DE | 10318270 A1 | 11/2004 | |
| DE | 102005042457 A1 | 3/2007 | |
| DE | 102016005993 A1 | 11/2017 | |
| FR | 827516 A | 4/1938 | |
| FR | 1037101 A | 9/1953 | |
| GB | 783998 A | 10/1957 | |
| GB | 1229712 A | 4/1971 | |
| JP | 2003159587 A | 6/2003 | |
| KR | 100849648 B1 | 7/2008 | |
| KR | 1020080101819 A | 11/2008 | |
| KR | 100942868 B1 | 2/2010 | |
| KR | 1020160130565 A | 11/2016 | |
| KR | 1020160130681 A | 11/2016 | |
| KR | 101833105 B1 | 2/2018 | |
| WO | 2005123215 A1 | 12/2005 | |
| WO | 2014053101 A1 | 4/2014 | |
| WO | 2017098241 A2 | 6/2017 | |

OTHER PUBLICATIONS

Invitation to Pay Additional Fees for PCT/US2024/037650 (Oct. 28, 2024).

* cited by examiner

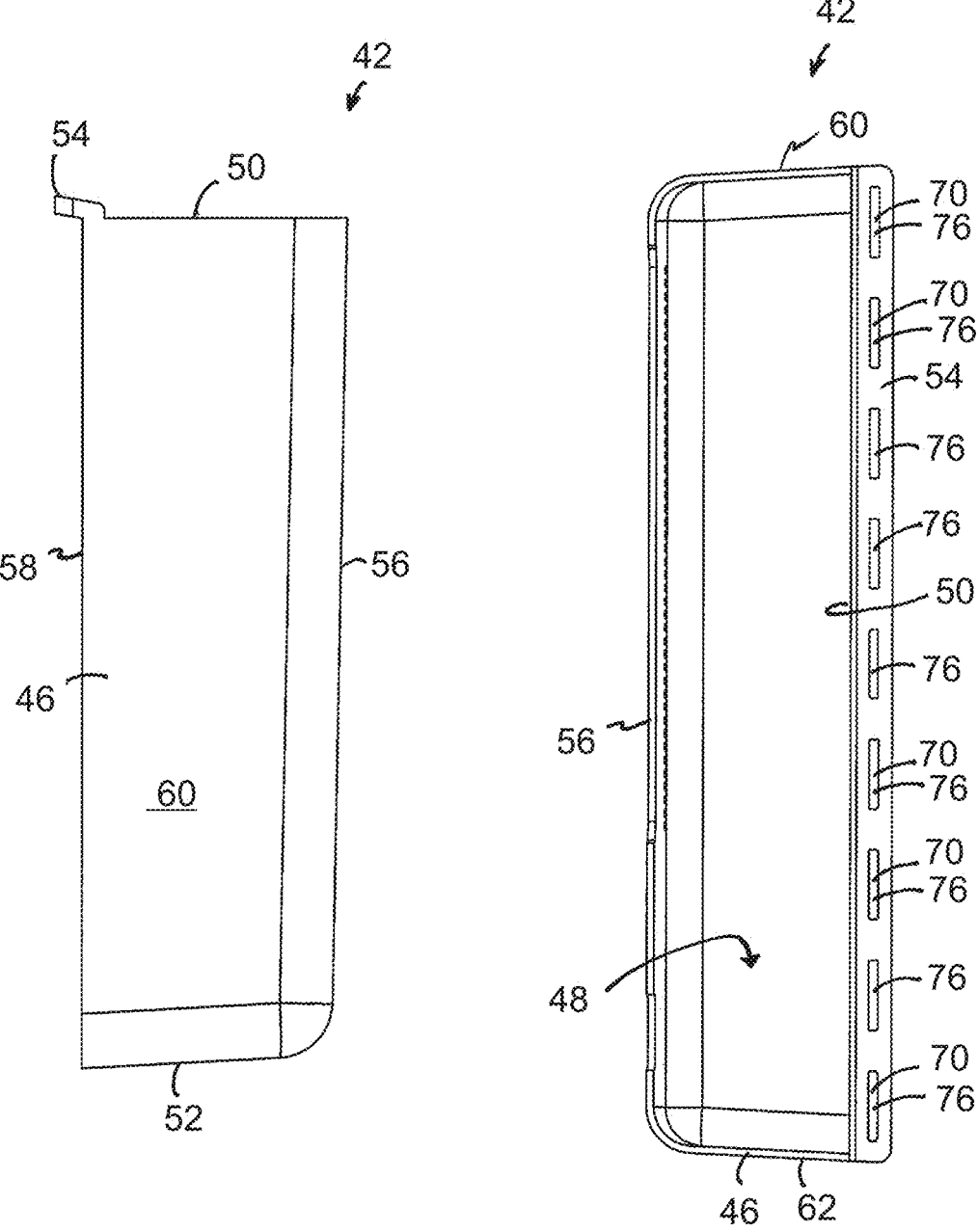
FIG. 6                    FIG. 7

AQUARIUM SYSTEM, BACK PANEL ASSEMBLY, AND METHODS OF USE

CROSS-REFERENCE TO RELATED APPLICATION

This application claims the benefit of U.S. Provisional Application No. 63/526,079, filed Jul. 11, 2023, the disclosure of which is incorporated herein by reference.

TECHNICAL FIELD

This disclosure relates to an aquarium system with a back panel assembly. In particular, this disclosure relates to a back panel assembly which can be easily mounted to an aquarium tank, and which has a cartridge holder and a plurality of filter cartridges.

BACKGROUND

Home aquariums are a popular hobby. People enjoy keeping fish and other aquatic animals in an aquarium for relaxation, enjoyment, and education.

To keep aquatic life healthy, aquariums need to use filter systems to clean the water of debris and remove toxic buildup of ammonia and nitrates. Finding the correctly sized filter cartridges for the home aquarium can be confusing and challenging for many aquarium hobbyists.

Solutions to this problem are desirable.

SUMMARY

Assemblies, components, and methods are provided to improve the prior art.

In one aspect, a back panel assembly for an aquarium is provided; the back panel assembly comprising (a) a housing having a surrounding wall defining an internal cavity; an open top in communication with the cavity; a bottom opposite of the open top; and a dependent lip adjacent to the open top projecting from the wall; (i) the dependent lip having a connecting structure permitting the housing to be removably attached to an aquarium; and (b) a cartridge holder removably positioned in the cavity of the housing.

The assembly may further include a plurality of filter cartridges removably positioned in the cartridge holder.

In example embodiments, each of the filter cartridges are the same size.

The assembly may further include a pump and a heater in the housing internal cavity; and a flow controller within the cartridge holder.

In some embodiments, the housing has a closed bottom.

In examples, the wall of the housing has an inlet opening arrangement therethrough.

In example embodiments, the cartridge holder comprises a framework defining a plurality of throughports; the framework having receiving slots along the throughports sized to receive the filter cartridges.

In many arrangements, the cartridge holder includes a baffle plate extending below the throughports.

In some embodiments, the cartridge holder further includes a flow controller housing with an open interior sized to hold the flow controller; the flow controller housing being adjacent to the throughports.

In examples, the connecting structure on the dependent lip includes one of openings or tabs.

In some embodiments, the dependent lip projects from the wall of the housing at an angle between 70-120 degrees.

In another aspect, an aquarium system is provided comprising: (a) a tank; the tank having a surrounding tank wall and bottom defining an interior, and an open top in communication with the interior; the open top having a rim; and (b) a back panel assembly in the interior of the tank; and (c) connecting structure between the back panel assembly and aquarium, permitting the back panel assembly to be removably attached to the aquarium.

In example implementations, the surrounding wall of the tank includes a back wall; and the connecting structure includes a plurality of connection members along the rim of the back wall, wherein the back panel assembly can be removably attached to the aquarium along a plurality of positions along the back wall.

In one or more examples, the connecting structure includes tabs on one of the rim of the back wall or back panel assembly, and openings to receive the tabs on the other of the rim of the back wall or back panel assembly.

The connecting structure in example embodiments includes a plurality of tabs on the rim of the back wall, and a plurality of openings sized to receive the tabs in the back panel assembly.

In one or more arrangements, the back panel assembly includes a housing having a surrounding wall defining an internal cavity; an open top in communication with the cavity; a bottom opposite of the open top; and a dependent lip adjacent to the open top projecting from the wall; the dependent lip having the plurality of openings sized to receive the tabs in the back panel assembly.

In some examples, the back panel assembly includes a cartridge holder removably positioned in the cavity of the housing.

Preferably, the tank includes a front wall opposite of the back wall, and two side walls extending between the front wall and back wall; the connection members being along the rim of the back wall a full extension between the two side walls.

In another aspect, a cartridge holder for use with an aquarium is provided. The cartridge holder includes (a) a framework defining a plurality of side-by-side throughports; the framework having receiving slots along the throughports sized to receive filter cartridges; and (b) a baffle plate extending below the throughports.

In example embodiments, the cartridge holder further includes a flow controller housing with an open interior sized to hold a flow controller; the flow controller housing being adjacent to the throughports.

Preferably, each of the throughports having at least two receiving slots to receive at least two filter cartridges.

In some arrangements, the framework includes an upper rim connecting the throughports to the flow controller housing.

In examples, there are at least three throughports.

In some embodiments, the flow controller housing includes an opening accommodating a diffuser body of the flow controller.

Some implementations further include a plurality of filter cartridges removably mounted within the slots of the throughports.

Preferably, each of the filter cartridges is a same size.

In example embodiments, each of the filter cartridges has a handle being accessible from the throughports and extending in a direction away from the rest of the filter cartridge.

In another aspect, a method of using a back panel assembly on an aquarium is provided; the method comprising: (a) providing an aquarium tank having a back wall with an upper rim having spaced first connectors along an entire length of the rim of the back wall; (b) providing a back panel assembly having a housing with a dependent lip and spaced second connectors, shaped to mate with the first connectors; (c) selecting a location anywhere along the length of the rim of the back wall to position the back panel assembly; and (d) mating the first and second connectors together to attach the back panel assembly to the back wall of the aquarium tank.

In the method, the first connectors includes one of tabs or openings; the second connectors includes the other of tabs or openings; and the step of mating includes inserting the tabs through the openings.

Preferably, the method further includes a step of removing a cartridge holder from the back panel assembly; the cartridge holder holding a plurality of filter cartridges.

In example methods, the step of removing a cartridge housing from the back panel assembly includes the cartridge holder holding a plurality of same sized filter cartridges.

Example methods further include a step of removing one or more filter cartridges from the cartridge holder and replacing with new filter cartridges.

A variety of examples of desirable product features or methods are set forth in part in the description that follows, and in part will be apparent from the description, or may be learned by practicing various aspects of this disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 6 is a side elevational view of a housing of the back panel assembly;

FIG. 7 is a top plan view of the housing of the back panel assembly;

DETAILED DESCRIPTION

Figure 1:
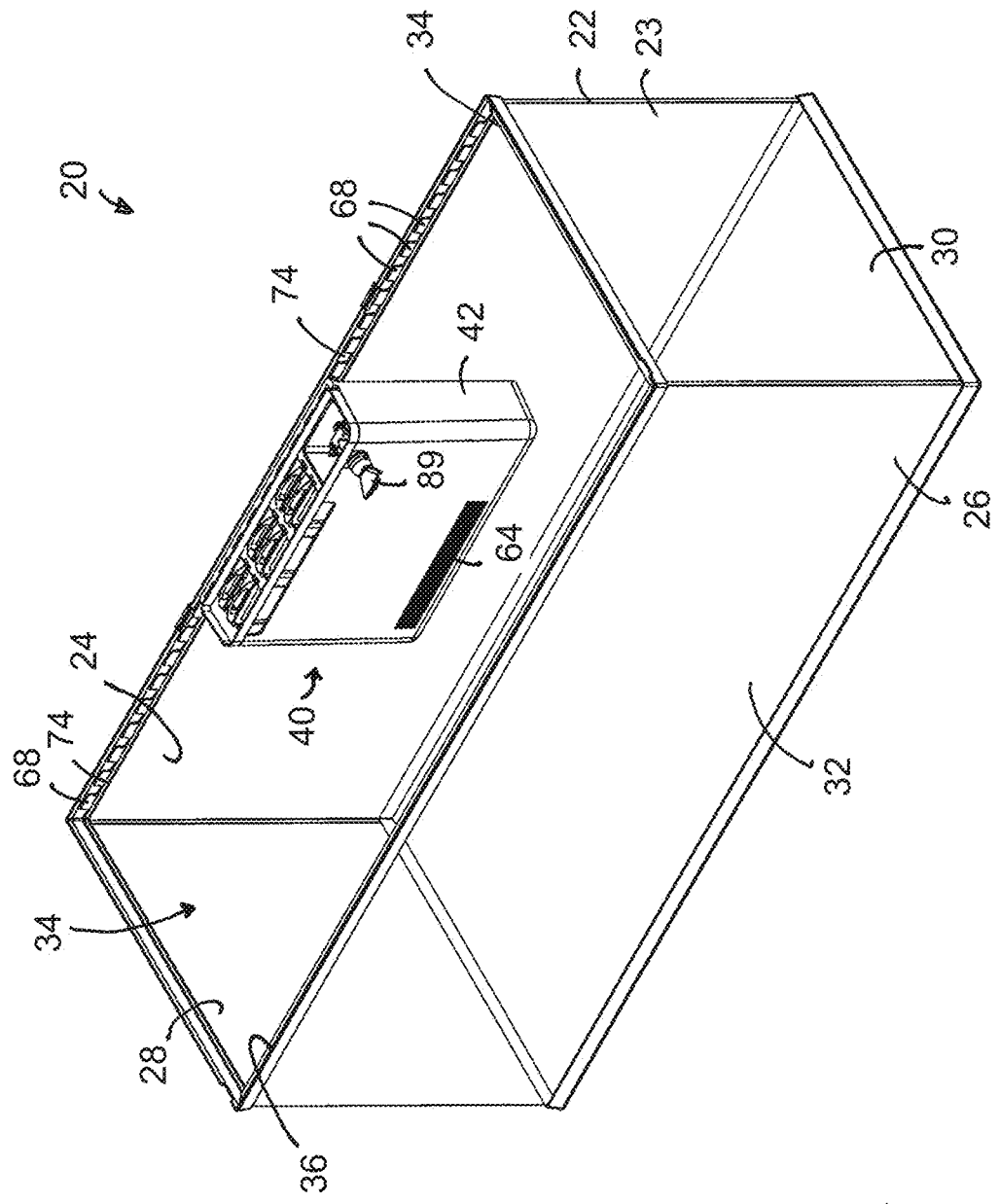
FIG. 1 is schematic view of an aquarium system, including a tank and a back panel assembly, constructed in accordance with principles of this disclosure.

FIG. 1 is a schematic view of one embodiment of an aquarium system 20. In FIG. 1, the system 20 has a tank 22 sized to hold water for sustaining aquatic life, such as fish.

The tank 22 shown has a rectangular cross-section, but it can be other shapes. While the tank may be of any size, some example sizes include 10 gallons, 20 gallons, 40 gallons, 50 gallons, 100 gallons to 200 gallons of water. In this example, the tank 22 has a surrounding wall 23 shown here as back wall 24, an opposite front wall 26, and two side walls 28, 30 extending between the front wall 26 and back wall 24. A closed bottom is at 32. Together, the surrounding wall 23 and closed bottom 32 define a tank interior 34.

The tank 22 has an open top 36, opposite of the closed bottom 32. The top 36 is in communication with the tank interior 34 and has a perimeter rim 38. The top 36 can be selectively covered with a removable cover, not illustrated.

The aquarium system 20 further includes a back panel assembly 40 positioned in the interior 34 of the tank 22. In the example of FIG. 1, the back panel assembly 40 is positioned against the back wall 24 of the tank 22.

Figure 9:
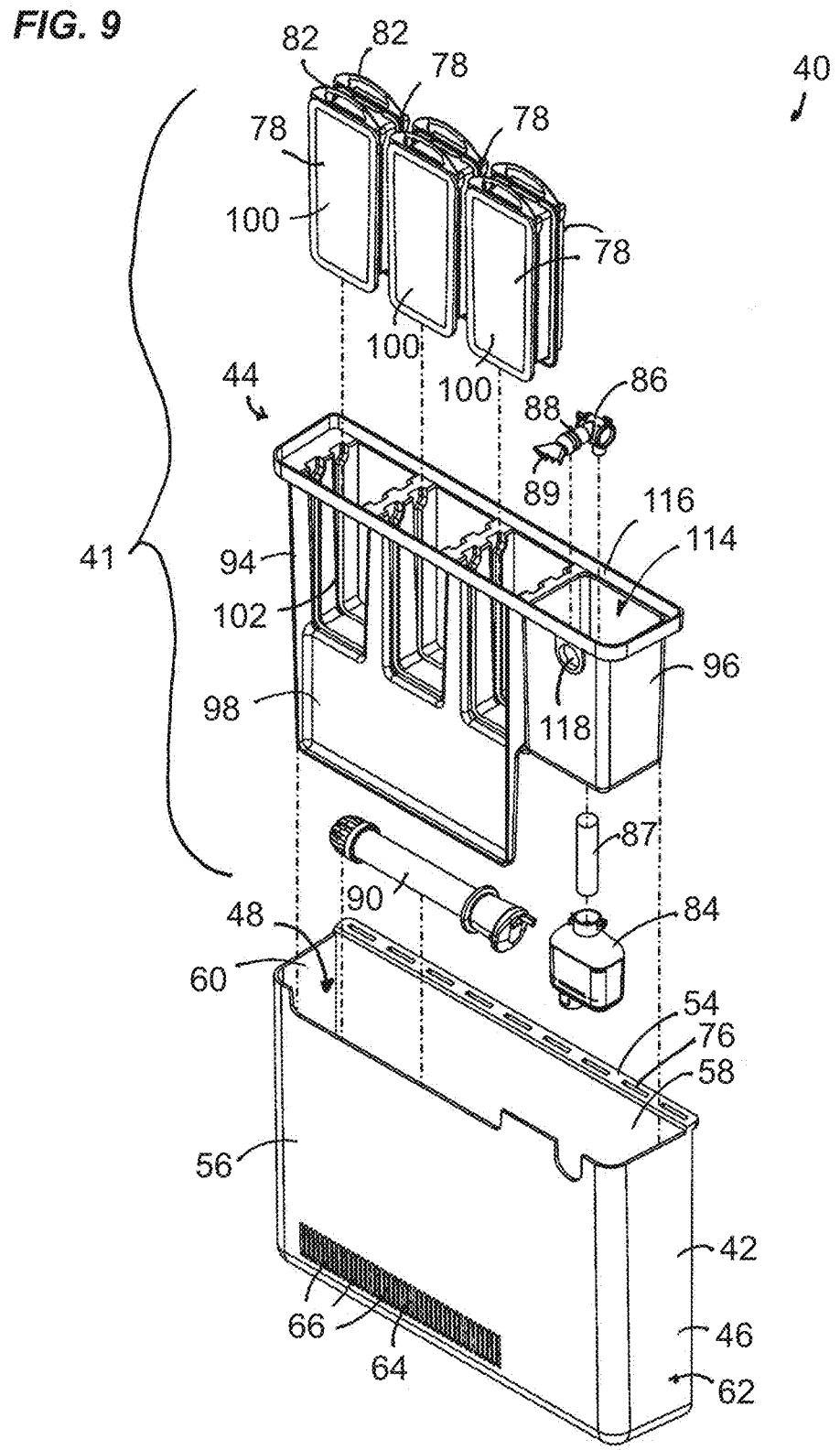
FIG. 9 is an exploded perspective view of the back panel assembly, showing interior components including the cartridge holder, filter cartridges, pump, and heater exploded from the back panel housing.

FIG. 9 illustrates the back panel assembly 40 with internal components 41 exploded out for illustration. The back panel assembly 40 has a housing 42 and a selectively removable cartridge holder 44.

The housing 42 has a surrounding wall 46 defining an internal cavity 48. An open top 50 communicates and provides access to the cavity 48. A closed bottom 52 is opposite of the open top 50. A ledge or dependent lip 54 is next to/adjacent to the open top 50 and projects from the wall 48 away from a remaining part of the housing 42.

The surrounding wall 46 of the housing 42 is generally rectangular in shape, in that it has a front wall 56, an opposite back wall 58, and a pair of side walls 60, 62 extending between the front wall 56 and back wall 58. The back wall 58, in this example, is closed and non-porous. In this example, the front wall 56 has a water inlet arrangement 64 near the bottom 52, embodied as a plurality of slot-shaped openings 66.

Figures 2, 3:
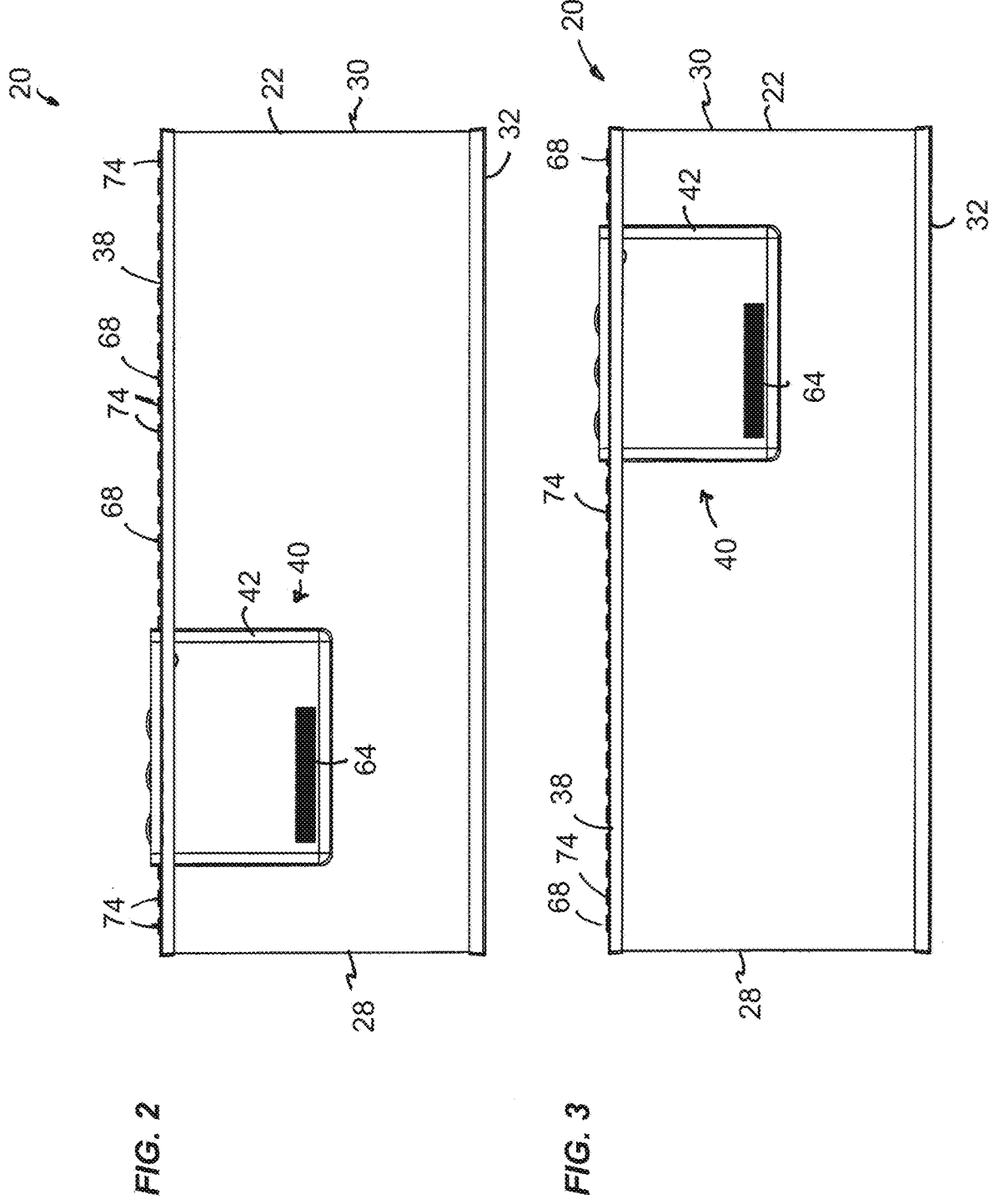
FIG. 2 is a front view of the aquarium system of FIG. 1, with the back panel assembly positioned at a different location along the tank back panel than in FIG. 1.
FIG. 3 is a front view of the aquarium system of FIG. 1, with the back panel assembly positioned at a different location along the tank back panel than in FIGS. 1 and 2.
Figure 4:
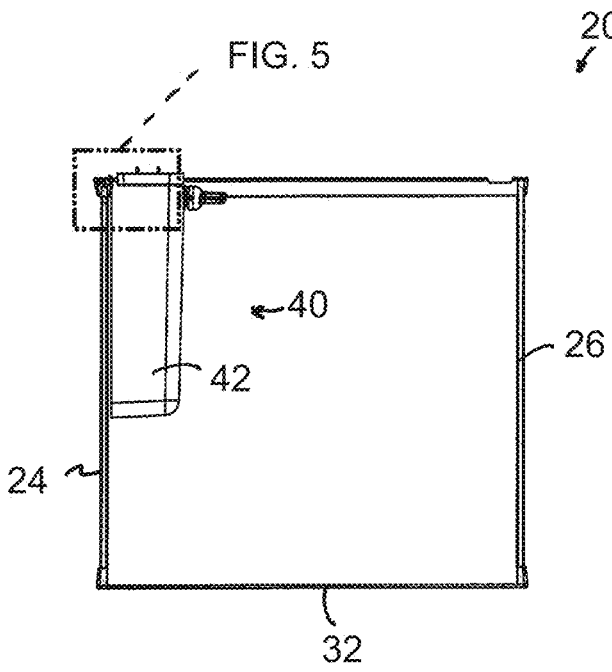
FIG. 4 is a left side view of the aquarium system of FIG. 1.

In reference now to FIGS. 1-3, the back panel assembly 40 is selectively movable and positionable at a location anywhere along the length of the rim 38 of the back wall 24 of the tank 22. In FIG. 1, the back panel assembly 40 is shown centered on the back wall 24; in FIG. 2, the back panel assembly 40 is located closer to the side wall 28; and in FIG. 3, the back panel assembly 40 is located closer to the side wall 30. Each of these is an example location, and it should be understood that the locations of the position of the back panel assembly 40 can be anywhere between the side walls 28, 30, and the positioning can be done quickly, easily, and without the use of tools.

In particular, the upper rim 38 has a plurality of spaced first connectors 68 along an entire length of the rim 38 of the back wall 24, while the back panel assembly 40 has a plurality of spaced second connectors 70 shaped to releasably mate with the first connectors 68. By mating the first connectors 68 and second connectors 70, the back panel assembly 40 can be selectively attached (connected) to the tank 22, and in this example, to the wall 23 including the back wall 24 of the tank 22.

In this example, the dependent lip 54 of the housing 42 of the back panel assembly 40 has connecting structure 72, which form the second connectors 70. While many variations are possible, the first connectors 68 includes a first of tabs or openings; and the second connectors 70 includes the other (or second) of tabs or openings. In general, the tabs are sized to be received by the openings.

Figure 5:
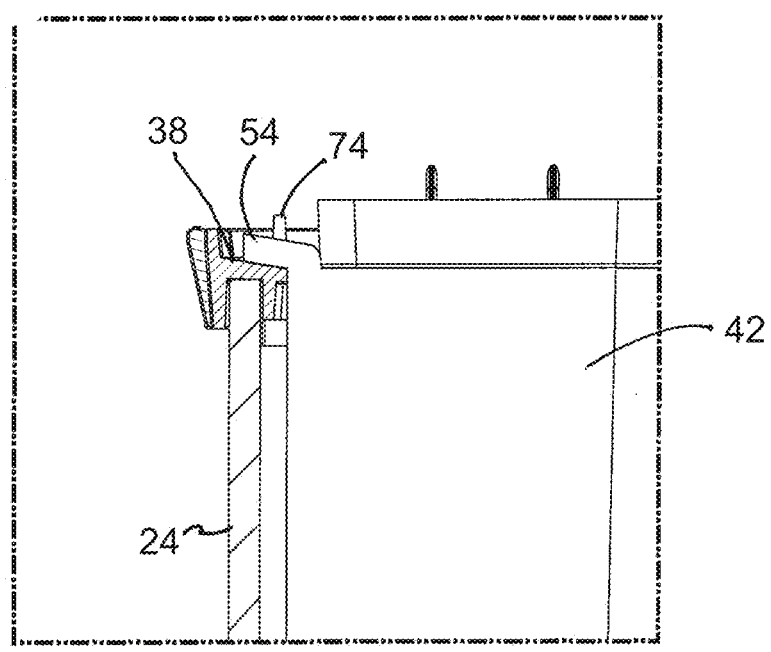
FIG. 5 is an enlarged cross-sectional view of a portion of the back panel assembly and tank of FIG. 4.

In the particular embodiment depicted in the drawings, the first connectors 68 are tabs 74 (FIG. 5) projecting straight up along a plane generally either co-planar or parallel to the back wall 24. The tabs 74 are evenly spaced from each other along the rim 38, between the side walls 28, 30. The second connectors 70 are apertures or slotted openings 76 (FIG. 7). The openings 76 are evenly spaced from each other along the dependent lid 54 between the side walls 60, 62 of the housing 42 of the back panel assembly 40. The openings 76 are sized to receive the tabs 74, to allow the tabs 74 to project therethrough (FIG. 5). There are at least 2 openings 76; typically 3-15 openings 76; and often 5-10 openings 76. The step of mating the first and second connectors 68, 70 includes inserting the tabs 74 through the openings 76.

In FIG. 6, it can be seen that the dependent lip 54 projects from the back wall 58 of the housing 42 at angle between 70-120 degrees, typically 80-110 degrees.

Turning again to FIG. 9, the internal components 41 of the back panel assembly 40 include a plurality of filter cartridges 78. The filter cartridges 78 are removably and replaceably positioned in the cartridge holder 44. In the example shown in FIG. 9, there are 6 individual cartridges 44 shown, but there could be fewer or more, depending on the size of the tank 22 and the flow rate. The cartridges 78 are arranged in 3 sets of pairs, a pair being two of the cartridges 78 lined up facing each other. The cartridges 78 can be mechanical to strain out debris; biological to remove toxic ammonia and nitrogen; and chemical to remove various impurities.

Figures 12, 13:
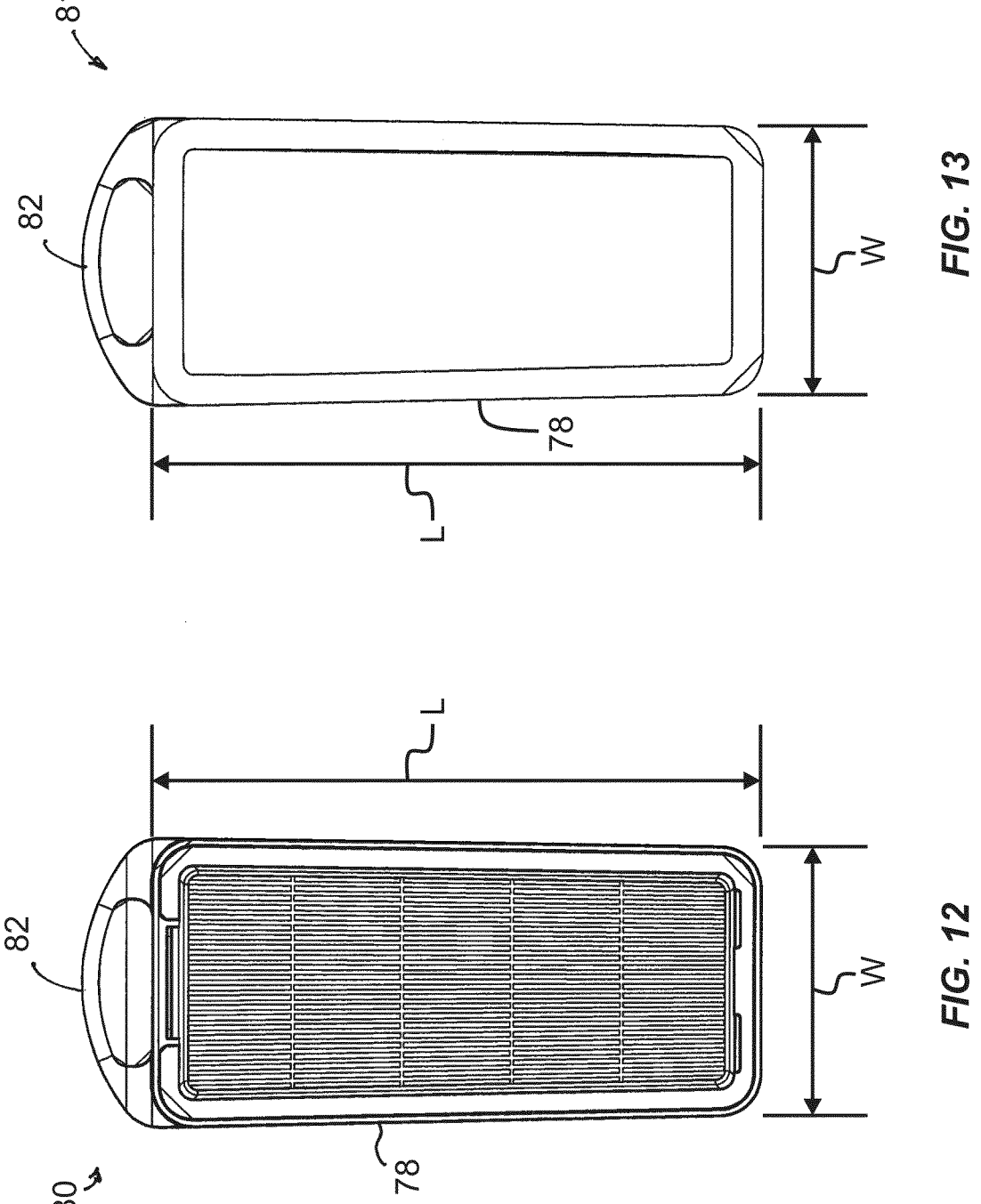
FIG. 12 is a front view of one of the filter cartridges used in the back panel assembly.
FIG. 13 is a front view of another of the filter cartridges used in the back panel assembly.

Two example filter cartridges 78 are shown in FIGS. 12 and 13 at 80, 81. Cartridges 80, 81 can be the same type of filter (e.g., both mechanical), or they can be different (e.g., one mechanical and the other biological or chemical). Note that the cartridges 78, 80, 81 are all the same size, in that they have the same width W and same length L. They may vary in thickness, but they have the same overall dimensions. In this case, each of the cartridges 78 also has an axially extending handle 82. The handles 82 project above the top of the cartridge holder 44, so that each cartridge 78 may be easily removed from the cartridge holder 44. Having all of the cartridges 78 the same size results in less consumer confusion.

Turning again to FIG. 9, the internal components 41 includes a pump 84 and a flow controller 86. A tube 87 can be seen connecting the pump 84 and flow controller 86. The pump 84 will typically be powered by electricity, and the power cord is omitted from the drawings for simplicity. The pump 84 draws tank water from the tank 22 into the housing 42 through the inlet arrangement 64. The water is then directed through the filter cartridges 78, and the water is channeled through the tube 87 and then the flow controller 86. Connected to the flow controller 86 is a diffuser body 88 having diffuser blade 89, which extends from the housing 42, and the filtered water is returned to the rest of the tank 22 by being expelled through the diffuser blade 89.

FIG. 9 also depicts a heater 90, which is contained in the housing 42. The heater 90 can be attached to the cartridge holder 44 with a bracket 92, or other suitable fastener. The heater 90 will typically be powered with electricity, although the power cord is not shown for purposes of clarity.

Figure 10:
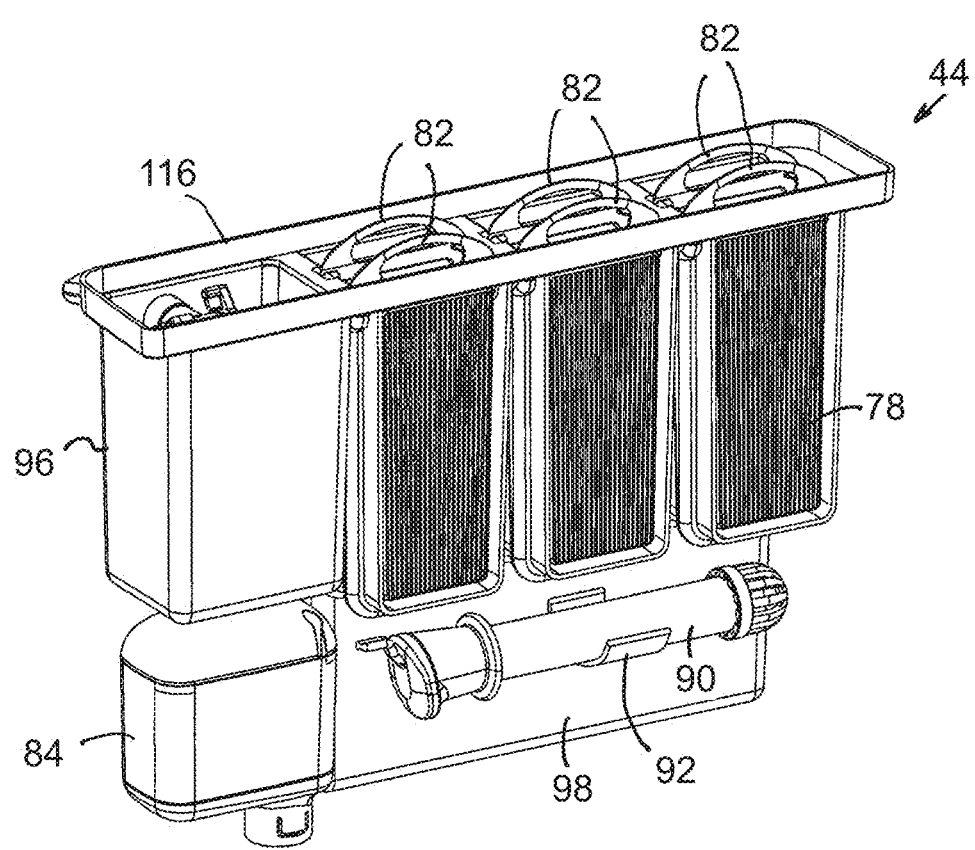
FIG. 10 is a perspective view of the interior components of the back panel assembly.
Figure 11:
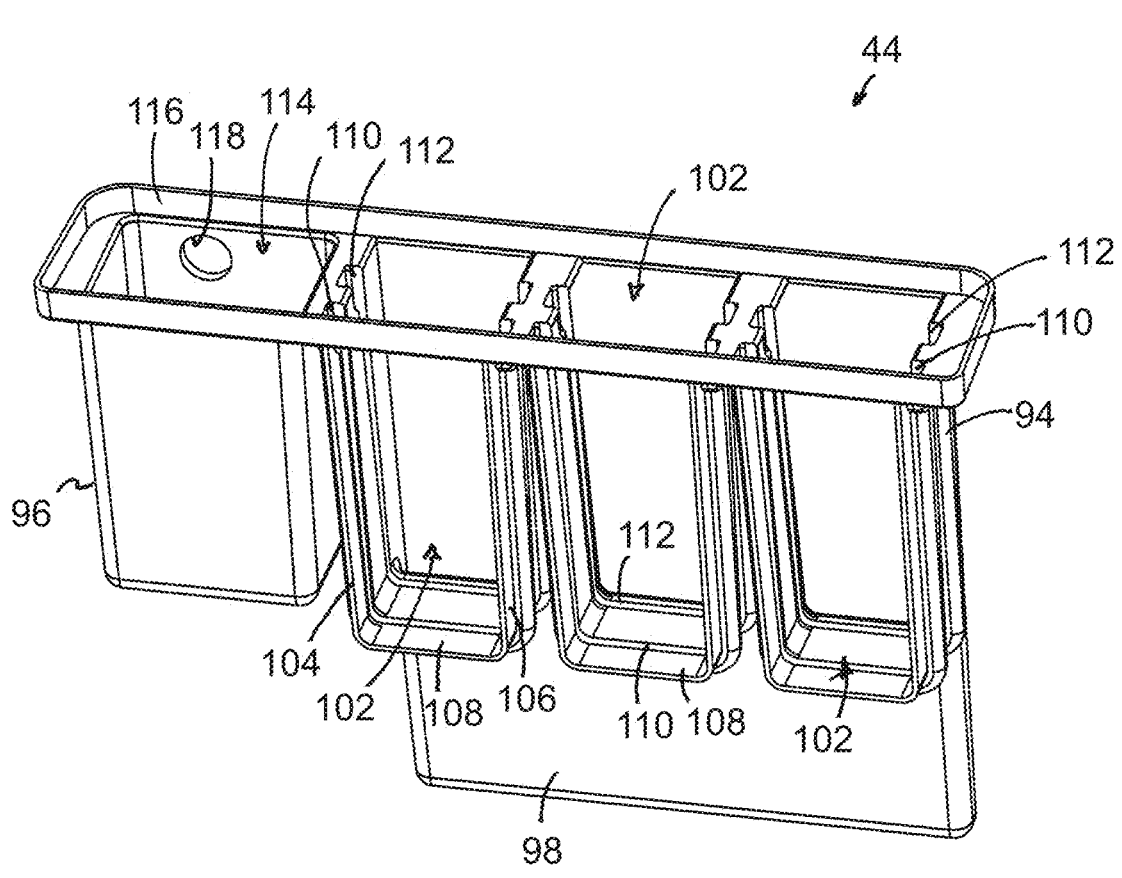
FIG. 11 is a perspective view of the cartridge holder of the back panel assembly.

In reference now to FIGS. 10 and 11, the cartridge holder 44 is depicted. The cartridge holder 44 includes a framework 94 and a flow controller housing 96. A baffle plate 98 extends below the framework 94. When the cartridge holder 44 is positioned in the housing 42, the baffle plate 98 faces the inlet arrangement 64 so that the water drawn in from the tank 22 through the inlet arrangement 64 and into the cavity 48 of the housing 42 will be directed up to the upstream sides 100 (FIG. 9) of the filter cartridges 78.

The framework 94 defines a plurality of side-by-side openings or throughports 102 for holding the filter cartridges 78. The throughports 102 are generally rectangular in shape, each have opposite parallel sides 104, 106, joined by a base 108 and an top providing access. In the example shown, there are at least 2 throughports 102, and as shown, 3 throughports 102.

In FIG. 11, the framework 94 can be seen as having two receiving slots 110, 112 in each port 102, the slots 110, 112 being along the internal portion of the sides 104, 106 and base 108. Each slot 110, 112 is sized to receive one of the filter cartridges 78, such that there are two cartridges 78 in each throughport 102. The filter cartridges 78 are removably mounted within the slots 110, 112 of the throughports 102. The baffle plate 98 is extends from and below the throughports 102.

As can be seen in FIG. 10, each of the filter cartridges 78 has its handle 82 being accessible from the throughports 102. The handles 82 extend in a direction away from a remaining part of the cartridges and the cartridge holder 44.

The flow controller housing 96 has an open interior 114. In the interior 114, the tube 87 and the flow controller 86 are held. The flow controller housing 96 is adjacent to the throughports 102. The pump 84 is located under the flow controller housing 96, and is in communication with the interior 114 of the flow controller housing 114. The framework 94 includes an upper rim 116 connecting the throughports 102 to the flow controller housing 96.

In FIGS. 9 and 11, it can be seen how the flow controller housing 96 includes an aperture or opening 118 accommodating the diffuser body 88 of the flow controller 86.

A method of using the back panel assembly 40, based on the above description, should be apparent. The method includes providing aquarium tank 22 having back wall 24 with upper rim 38 having spaced first connectors 68 along an entire length of the rim 38 of the back wall 24.

The method includes a step of providing back panel assembly 40 having housing 42 with dependent lip 54 and spaced second connectors 70, shaped to mate with the first connectors 68.

Figure 8:
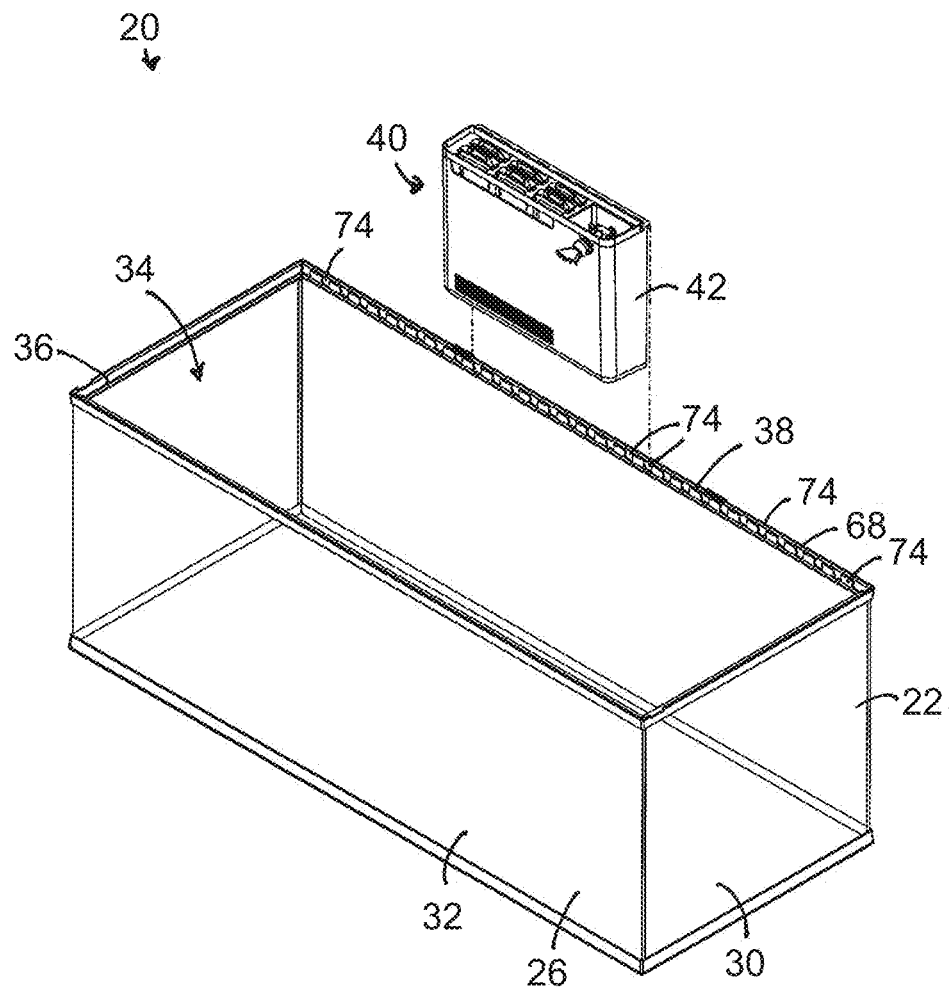
FIG. 8 is an exploded perspective view of the aquarium system and back panel assembly of FIG. 1.

The method includes selecting a location anywhere along the length of the rim 38 of the back wall 24 to position the back panel assembly 40. See FIG. 8, in which the back panel assembly 40 is unattached to the tank 22, while a desired location is selected.

The method includes mating the first and second connectors 68, 70 together to attach the back panel assembly 40 to the back wall 24 of the aquarium tank 22.

In cases in which the tank 22 is larger, additional back panel assemblies 40 can be positioned along the rim 38 of the tank 22.

The first connectors 68 includes one of tabs 74 or openings 76. The second connectors 70 includes the other of tabs 74 or openings 76. The step of mating includes inserting the tabs 74 through the openings 76.

The method can further include a step of removing the cartridge holder 44 from the back panel assembly 40. The cartridge holder 44 holds a plurality of filter cartridges 78.

The step of removing the cartridge holder 44 from the back panel assembly 40 includes the cartridge holder 44 holding a plurality of same sized filter cartridges 78.

The method can further include a step of removing one or more filter cartridges from the cartridge holder and replacing with new filter cartridges.

The above disclosure includes example principles. Many embodiments can be made using these principles.

What is claimed is:

1. A back panel assembly for an aquarium; the back panel assembly comprising:

(a) a housing having a surrounding wall defining an internal cavity; an open top in communication with the cavity; a bottom opposite of the open top; and a dependent lip adjacent to the open top projecting from the wall;

(i) the dependent lip having a connecting structure comprising a plurality of spaced openings sized to receive corresponding tabs from an aquarium rim, wherein the spaced openings are positioned along a length of the dependent lip to enable selective positioning of the back panel assembly at multiple locations along the aquarium rim permitting the housing to be removably attached to an aquarium; and (b) a cartridge holder removably positioned in the cavity of the housing.

2. The back panel assembly of claim 1 further including a plurality of filter cartridges removably positioned in the cartridge holder.

3. The back panel assembly of claim 2 wherein each of the filter cartridges are the same size.

4. The back panel assembly of claim 1 further including a pump and a heater in the housing internal cavity; and a flow controller within the cartridge holder.

5. The back panel assembly of claim 1 wherein the housing has a closed bottom.

6. The back panel assembly of claim 1 wherein the wall of the housing has an inlet opening arrangement therethrough.

7. The back panel assembly of claim 1 wherein the cartridge holder comprises a framework defining a plurality of throughports; the framework having receiving slots along the throughports sized to receive the filter cartridges.

8. The back panel assembly of claim 7 wherein the cartridge holder includes a baffle plate extending below the throughports.

9. The back panel assembly of claim 7 wherein the cartridge holder further includes a flow controller housing with an open interior sized to hold the flow controller; the flow controller housing being adjacent to the throughports.

10. The back panel assembly of claim 1 wherein the dependent lip projects from the wall of the housing at an angle between 70-120 degrees.

* * * * *